United States Patent [19]

Swars

[11] Patent Number: 5,165,304
[45] Date of Patent: Nov. 24, 1992

[54] ASSEMBLED SHAFT

[75] Inventor: Helmut Swars, Bergisch Gladbach, Fed. Rep. of Germany

[73] Assignee: Mannesmann Aktiengesellschaft, Dusseldorf, Fed. Rep. of Germany

[21] Appl. No.: 776,679

[22] Filed: Oct. 11, 1991

Related U.S. Application Data

[63] Continuation-in-part of Ser. No. 452,569, Dec. 18, 1989, abandoned.

[30] Foreign Application Priority Data

Dec. 17, 1988 [DE] Fed. Rep. of Germany ....... 3842590

[51] Int. Cl.$^5$ .............................................. F16H 53/00
[52] U.S. Cl. .......................................... 74/567; 72/58; 74/568 R; 123/90.17; 123/90.6
[58] Field of Search ..................... 74/567, 568 R, 569; 72/58 X; 123/90.34, 90.60, 90.33, 90.17; 29/523 X, 430, 421.1, 90.6

[56] References Cited

U.S. PATENT DOCUMENTS

| 4,293,995 | 10/1981 | Jordan ............................ 74/567 X |
| 4,693,138 | 9/1987 | Hughes et al. ................. 123/90.6 X |
| 4,783,838 | 11/1988 | Kanamaru et al. ................ 29/523 |
| 4,867,004 | 9/1989 | Swars ................................. 74/567 |
| 4,875,270 | 10/1989 | Krips et al. ...................... 29/421.1 |

FOREIGN PATENT DOCUMENTS

| 3227693 | 1/1984 | Fed. Rep. of Germany ........ 74/567 |
| 3633435 | 4/1988 | Fed. Rep. of Germany ........ 74/567 |
| 3803683 | 8/1989 | Fed. Rep. of Germany ........ 74/567 |
| 149655 | 9/1982 | Japan ..................................... 74/567 |

Primary Examiner—Vinh T. Luong
Attorney, Agent, or Firm—Anderson Kill Olick & Oshinsky

[57] ABSTRACT

An assembled shaft, especially a camshaft, gearbox shaft or crankshaft with at least one tubular member and several elements spaced thereon and fixed thereto in a force-locking way by of expansion of same in longitudinal portions, such elements being cams, gears, bearing sleeves or crank webs. The shaft can be made up of a tubular member which, while having an approximately uniform wall thickness, is provided with a reduced diameter in the region between two elements. As a result, when applying a suitable internal pressure to the entire tubular member, the portions with the larger diameter are plastically deformed relative to the drive elements to be fixed, whereas deformation of the tubular portions with the smaller diameter positioned between the drive elements is purely elastic. In an advantageous embodiment, the region between two elements has been provided with sleeves whose diameter is greater than that of the tubular member and whose ends are clamped in between the tubular member in the region with the larger diameter and the elements.

15 Claims, 2 Drawing Sheets

ASSEMBLED SHAFT

This is a continuation-in-part application of Ser. No. 07/452,569, filed Dec. 18, 1989, now abandoned.

BACKGROUND OF THE INVENTION

1. Field of the Invention

The invention relates to an assembled shaft, especially a camshaft, gearbox shaft or crankshaft, at least a tubular member and several elements spaced thereon and fixed thereto in a force-locking way by expansion thereof in longitudinal portions, in the case of which, especially always between two elements, a sleeve having a diameter greater than that of the tubular member has been clamped in between the tubular member and the elements.

2. Description of the Prior Art

Shafts of this type have been described in DE 38 03 683.5. Their advantage consists in their good bending and torsional strength due to their double-shell-like design. From a production-technical point of view they are advantageous in that due to the fact that the tubular member is expanded exclusively in the region of the elements to be fixed, it is not necessary to use an expensive die. Instead, they require special expanding probes by means of which only individual longitudinal portions can be expanded, but they still suffer from sealing problems. If only one of several seals fails, an overall pressure cannot build up. As the service life of the seals is not always the same and cannot always be predicted, process reliability is not always ensured.

SUMMARY OF THE INVENTION

It is therefore an object of the present invention to provide an assembled shaft and a process for producing it in which the sealing problems occurring during expansion of the individual longitudinal portions are reduced.

Pursuant to this object, and others which will become apparent hereafter, one aspect of the present invention resides in the tubular member, while having an approximately uniform wall thickness, being provided with a reduced diameter in the region between two elements.

As a consequence, due to certain laws (dish shape), it is possible, upon application of a suitable pressure, to plasticize the regions with a larger diameter underneath the elements, whereas the regions with the smaller diameter stand up to the same internal pressure.

The selected shape of the tubular member alone permits the use of a considerably simplified expansion process in which sealing is limited to two ends of the tubular member. If one of the initially open ends of the tubular member is closed by a plug, it is possible, especially if the tube is in a vertical position, for the entire tube to be filled with a pressurized fluid in a bubble-free way, with the pressure subsequently being increased by a conventional pressure generator. Instead of water, which is generally used as the pressure fluid, it is possible to use a wax-like substance or the like. Pressure may be generated in a simple way in that a punch is inserted into the open tube end or two punches arranged opposite each other are inserted into the two open tube ends, after the tube interior has been filled completely with the pressurized fluid.

In principle, the process in accordance with the invention may also be applied to shafts which have not been provided with additional sleeves with a larger diameter between the elements, but in the case of which even the smaller diameter of the intermediate regions may be chosen to be relatively large in order to achieve the required strength. However, it is the primary objective of this type of design to provide sleeves with an increased diameter to be fixed between the tubular member and element, which sleeves, due to their higher resistance moments, have a clearly increased torsional and bending strength relative to the tubular member. In this way it is possible to achieve considerable weight savings, while at the same time maintaining or even increasing the deformation strength as compared to previously known designs. The more lightweight tubular member may now take on the part of exclusively acting as auxiliary means for fixing the elements on the sleeves. Instead of a single sleeve, it is possible, as described above, to use a double sleeve.

In a first embodiment of the invention, the sleeves between the elements are again increased as compared to the regions of the tubular member on which the elements are fixed. As a rule, the sleeves are divided so that they either abut or are inserted into each other underneath the elements.

According to a second embodiment, which may also be combined with the first embodiment, the sleeves are provided in the form of continuous tubular members with a uniform diameter. If these are used on their own, it means giving up higher resistance moments, but on the other hand because of the single-piece design and the fact that the sleeves do not have to be deformed, production-technical advantages are achieved. If the sleeves are particularly lightweight, the individual fixed sleeves may be designed as smooth bearing sleeves. By selecting a suitable sleeve material and subjecting the sleeves to a suitable type of heat treatment, the sleeves between two elements may themselves act as bearing regions.

In a further embodiment, the regions of transition from the tubular portions with the larger diameter to the tubular portions with the smaller diameter are designed to be conical in order to further uniform radial deformation of the tubular regions with the larger diameter in the edge regions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
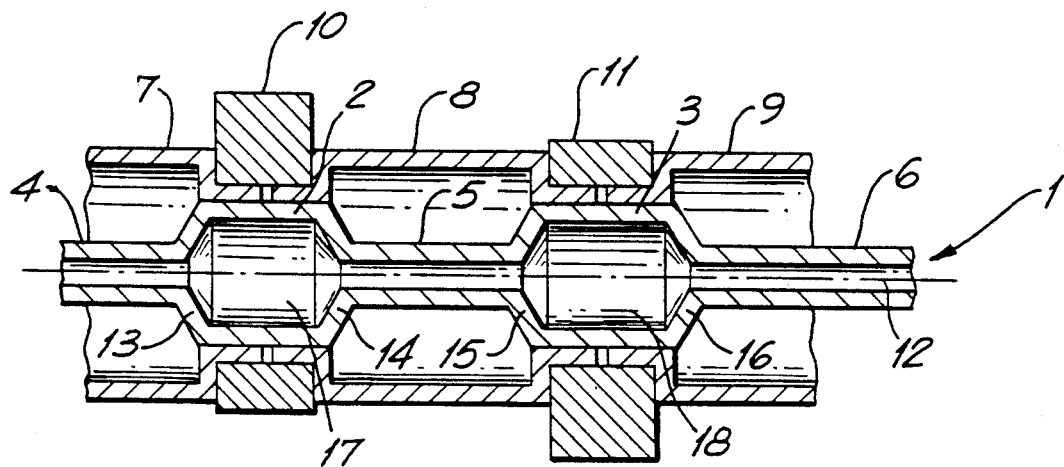
FIG. 1 shows an assembled shaft pursuant to the present invention with divided, stepped sleeves.
Figure 5:
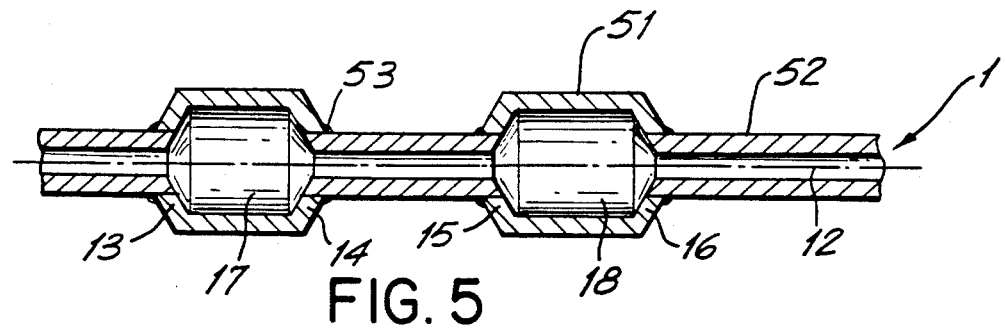
FIG. 5 shows a tubular member made of portions inserted into each other.

FIG. 1 shows a tubular member 1 comprising regions 2, 3 with a greater diameter and intermediate portions 4, 5, 6 with a reduced diameter. Stepped sleeves 7, 8, 9 clamped in between the large diameter regions 2, 3 of the tubular member and drive elements 10, 11 fixed thereto have been slid on to the tubular member 1. Areas of transition 13, 14, 15, 16 from the regions 2, 3 with the greater diameter to the regions 4, 5, 6 with the reduced diameter, are outwardly conical relative to the drive elements 10, 11. In these areas of transition, an inner bore 12 of the tubular member 1 passes into interior spaces 17, 18 of the tubular member 1 which are deformed plastically when pressure is applied to the tube in order to achieve a permanent elastic pretension in the drive elements 10, 11 for producing a form-fitting connection. The tubular member 1 may be produced in one piece by plastic deformation. It is also possible to achieve the graduated diameters and wall thicknesses of the tubular member by joining individual parts 51 (e.g. welding, soldering 53) as shown in FIG. 5.

Figure 3:
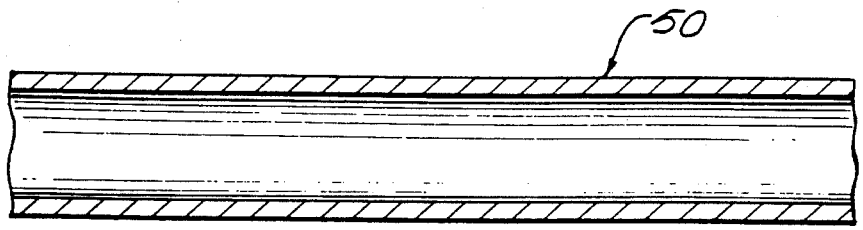
FIG. 3 shows the tubular member of the assembled shaft prior to rolling or hammering.
Figure 4:
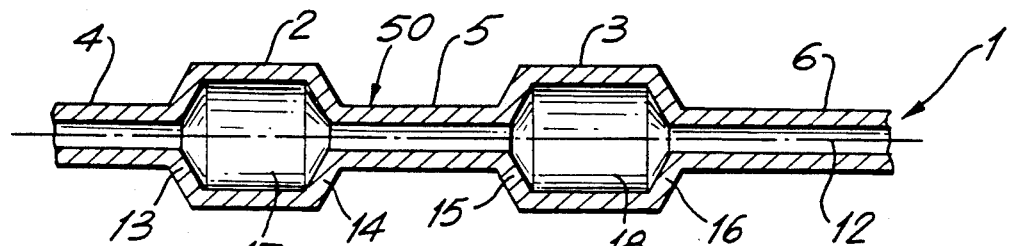
FIG. 4 shows the tubular member of FIG. 3 after rolling or hammering.

FIG. 3 shows a hollow tubular member 50 which starts out with a constant diameter and is rolled or hammered to provide the reduced diameter portions 4, 5, 6 shown in FIG. 4.

Figure 2:
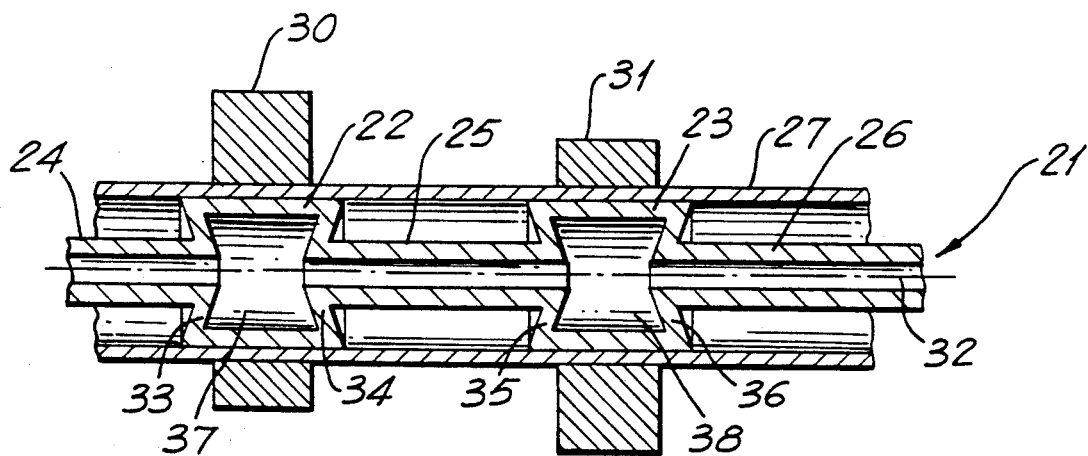
FIG. 2 illustrates an assembled shaft pursuant to the present invention with a continuous sleeve with a uniform diameter.

FIG. 2 shows a tubular member 21 comprising longitudinal portions 22, 23 with a greater diameter and intermediate regions 24, 25, 26 with a smaller diameter. A single continuous sleeve 27 produced in one piece is slid on to the regions with the larger diameter. As a result of hydraulic expansion of the greater diameter portions 22, 23 of the tubular member, the sleeve 27 is clamped in underneath slid-on drive elements 30, 31. Areas of transition 33, 34, 35, 36 of the tubular member from the regions 24, 25, 26 with the smaller diameter to the portions 22, 23 with the greater diameter are drawn inwardly so as to be conical relative to the drive elements 30, 31. In these areas of transition, the inner bore 32 of the tubular member 21 extends into the interior spaces 37, 38 of the tubular member 21 which, when internal pressure is applied, are deformed plastically against the elastic pretension of the drive elements.

Figure 6:
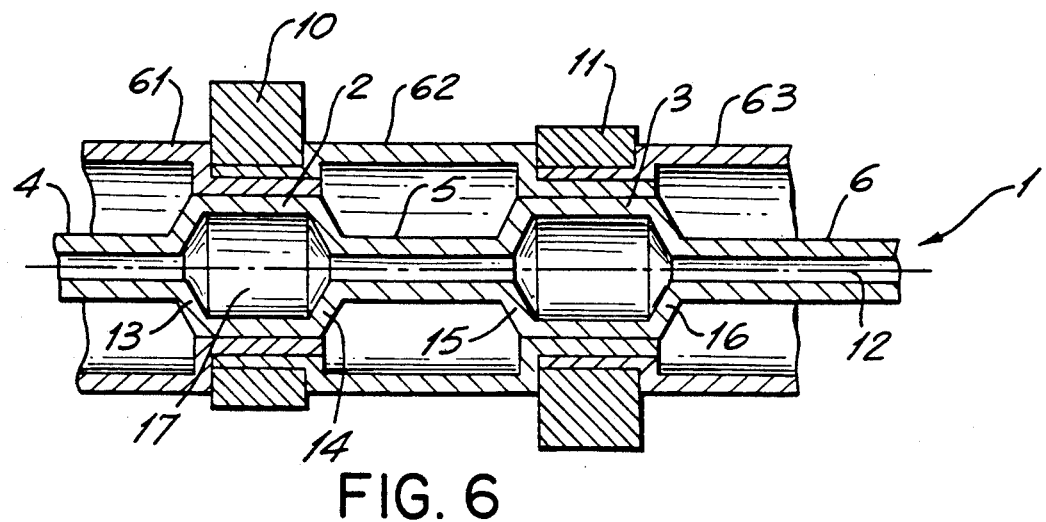
FIG. 6 shows a shaft having overlapping sleeves.

As shown in FIG. 6, the single sleeve 27 of FIG. 2 can be made of individual sleeves 61, 62, 63 which overlap underneath the elements.

While the invention has been illustrated and described as embodied in an assembled shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. An assembled shaft, comprising:
   a tubular member;
   several elements spaced thereon and fixed thereto in a force-locking way by expansion of the tubular member in longitudinal portions, the tubular member having an approximately uniform wall thickness and being provided with a reduced diameter in a region between two of the elements; and
   sleeves between each two elements, the sleeves having an outer diameter greater than that of the tubular member between the elements, the sleeves being clamped between the tubular member and the elements.

2. An assembled shaft according to claim 1, wherein the tubular member has transition regions from the reduced diameter to a larger diameter below the elements, the transition regions being conical towards the reduced diameter between the elements.

3. An assembled shaft according to claim 1, wherein the tubular member initially is a tube with a constant diameter, the reduced diameter portions of the tubular member being produced by one of rolling and hammering the tube.

4. An assembled shaft according to claim 2, wherein the conical transition regions of the tubular member are inwardly drawn and produced by upsetting.

5. An assembled shaft according to claim 1, wherein the tubular member is composed of portions inserted into each other.

6. An assembled shaft according to claim 5, wherein the portions are roller-shaped sleeves and thin tubes inserted thereinto and welded or soldered together.

7. An assembled shaft according to claim 2, wherein the conical transition regions protrude outwardly relative to a respective element.

8. An assembled shaft according to claim 2, wherein the conical transition regions are pulled inwardly relative to a respective element.

9. An assembled shaft according to claim 1, wherein the outer diameter of the sleeves is greater in regions positioned axially between the elements than in regions clamped in between the tubular member and the elements.

10. An assembled shaft according to claim 9, wherein individual sleeves abut centrally underneath each element.

11. An assembled shaft according to claim 1, wherein the sleeves essentially have a uniform diameter.

12. An assembled shaft according to claim 11, wherein the sleeves are a single-piece tube which receives several elements.

13. An assembled shaft according to claim 9, wherein the sleeves are inserted into each other and overlap underneath the elements.

14. An assembled shaft according to claim 1, wherein the sleeves have a yield point which is higher than that of the tubular member and lower than that of the elements.

15. An assembled shaft according to claim 1, wherein the assembled shaft is one of a camshaft, a gearbox shaft and a crankshaft.

* * * * *